(12) United States Patent
Barriac et al.

(10) Patent No.: US 10,666,368 B2
(45) Date of Patent: *May 26, 2020

(54) SYSTEMS AND METHODS FOR REUSE OF WIRELESS COMMUNICATION RESOURCES IN NEIGHBORING COMMUNICATION NETWORKS

(71) Applicant: QUALCOMM Incorporated, San Diego, CA (US)

(72) Inventors: Gwendolyn Denise Barriac, Encinitas, CA (US); George Cherian, San Diego, CA (US); Simone Merlin, San Diego, CA (US); Alfred Asterjadhi, San Diego, CA (US); Yan Zhou, San Diego, CA (US); Gang Ding, San Diego, CA (US); Qingjiang Tian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,495

(22) Filed: Jul. 19, 2019

(65) Prior Publication Data
US 2019/0342017 A1    Nov. 7, 2019

Related U.S. Application Data

(63) Continuation of application No. 15/239,656, filed on Aug. 17, 2016, now abandoned.
(Continued)

(51) Int. Cl.
*H04B 17/318* (2015.01)
*H04W 72/08* (2009.01)
(Continued)

(52) U.S. Cl.
CPC .......... *H04B 17/318* (2015.01); *H04W 16/10* (2013.01); *H04W 72/042* (2013.01);
(Continued)

(58) Field of Classification Search
None
See application file for complete search history.

(56) References Cited

U.S. PATENT DOCUMENTS 7,206,840 B2 * 4/2007 Choi ..................... H04W 36/06
370/333
8,295,243 B2   10/2012 Malladi et al.
(Continued)

FOREIGN PATENT DOCUMENTS

CO         5721037 A2    1/2007
WO   WO-2005109792 A1   11/2005
(Continued)

OTHER PUBLICATIONS

International Search Report and Written Opinion—PCT/US2016/047594—ISA/EPO—dated Nov. 28, 2016.

*Primary Examiner* — Charles N Appiah
*Assistant Examiner* — Frank E Donado
(74) *Attorney, Agent, or Firm* — Paradice and Li LLP

(57) ABSTRACT

Methods and apparatus for managing reuse of a wireless medium are provided. One method of managing reuse of a wireless medium includes determining, at an access point, whether to allow reuse of the wireless medium by one or more stations in a basic service set (BSS). The method further includes transmitting, upon determining to allow reuse, an indication that reuse of the wireless medium can be permitted for stations meeting a criteria. The method further includes determining one or more reuse parameters. The method further includes transmitting the one or more reuse parameters.

4 Claims, 5 Drawing Sheets

Related U.S. Application Data

(60) Provisional application No. 62/253,617, filed on Nov. 10, 2015, provisional application No. 62/218,992, filed on Sep. 15, 2015.

(51) Int. Cl.
  *H04W 16/10* (2009.01)
  *H04W 72/04* (2009.01)
  *H04W 16/14* (2009.01)
  *H04W 84/12* (2009.01)
  *H04W 74/00* (2009.01)
  *H04W 88/08* (2009.01)

(52) U.S. Cl.
  CPC .......... *H04W 72/082* (2013.01); *H04W 16/14* (2013.01); *H04W 72/048* (2013.01); *H04W 74/006* (2013.01); *H04W 84/12* (2013.01); *H04W 88/08* (2013.01)

(56) References Cited

U.S. PATENT DOCUMENTS

| | | | |
|---|---|---|---|
| 8,472,322 B2 | 6/2013 | Black et al. | |
| 8,750,264 B2 | 6/2014 | Shatti | |
| 9,854,607 B1* | 12/2017 | Chu | H04W 52/241 |
| 9,942,857 B2* | 4/2018 | Lim | H04W 52/243 |
| 10,123,352 B2* | 11/2018 | Ahmed | H04W 74/0816 |
| 10,165,596 B2* | 12/2018 | Choi | H04L 43/16 |
| 2002/0142788 A1 | 10/2002 | Chawla et al. | |
| 2002/0188723 A1* | 12/2002 | Choi | H04W 36/06 |
| | | | 709/225 |
| 2006/0270418 A1 | 11/2006 | Hannu et al. | |
| 2007/0133489 A1 | 6/2007 | Ramesh et al. | |
| 2008/0159217 A1 | 7/2008 | Chang et al. | |
| 2009/0103465 A1 | 4/2009 | Chow et al. | |
| 2010/0157901 A1 | 6/2010 | Sanderovitz et al. | |
| 2012/0015659 A1 | 1/2012 | Kalyani et al. | |
| 2013/0229996 A1 | 9/2013 | Wang et al. | |
| 2013/0294354 A1 | 11/2013 | Zhang et al. | |
| 2014/0328191 A1 | 11/2014 | Barriac et al. | |
| 2014/0328264 A1 | 11/2014 | Merlin et al. | |
| 2014/0328268 A1 | 11/2014 | Zhu et al. | |
| 2014/0328269 A1 | 11/2014 | Zhu et al. | |
| 2014/0376453 A1* | 12/2014 | Smith | H04W 40/02 |
| | | | 370/328 |
| 2015/0078299 A1* | 3/2015 | Barriac | H04W 74/006 |
| | | | 370/329 |
| 2015/0124744 A1 | 5/2015 | Zhu et al. | |
| 2015/0237652 A1 | 8/2015 | Ross et al. | |
| 2016/0143058 A1* | 5/2016 | Son | H04W 76/11 |
| | | | 370/329 |
| 2016/0353480 A1* | 12/2016 | Choi | H04L 43/16 |
| 2016/0374087 A1* | 12/2016 | Liu | H04L 5/0007 |
| 2017/0006616 A1* | 1/2017 | Singh | H04W 74/0808 |
| 2017/0041952 A1* | 2/2017 | Kim | H04W 74/08 |
| 2017/0078887 A1 | 3/2017 | Barriac et al. | |
| 2017/0078891 A1* | 3/2017 | Cariou | H04W 16/10 |
| 2017/0079067 A1* | 3/2017 | Li | H04W 24/02 |
| 2017/0294949 A1 | 10/2017 | Zhang et al. | |
| 2018/0227952 A1 | 8/2018 | Kim et al. | |
| 2018/0270038 A1* | 9/2018 | Oteri | H04W 88/06 |

FOREIGN PATENT DOCUMENTS

| | | |
|---|---|---|
| WO | WO-2008024788 A2 | 2/2008 |
| WO | WO-2015089229 A1 | 6/2015 |
| WO | WO-2015119379 A1 | 8/2015 |

\* cited by examiner

SYSTEMS AND METHODS FOR REUSE OF WIRELESS COMMUNICATION RESOURCES IN NEIGHBORING COMMUNICATION NETWORKS

CLAIM OF PRIORITY UNDER 35 U.S.C. § 119

The present application for Patent is a Continuation of U.S. patent application Ser. No. 15/239,656 filed on Aug. 17, 2016 and entitled "SYSTEMS AND METHODS FOR REUSE OF WIRELESS COMMUNICATION RESOURCES IN NEIGHBORING COMMUNICATION NETWORKS," which claims priority to Provisional Application No. 62/218,992 filed on Sep. 15, 2015 and Provisional Application No. 62/253,617 filed on Nov. 10, 2015 both entitled "SYSTEMS AND METHODS FOR REUSE OF WIRELESS COMMUNICATION RESOURCES IN NEIGHBORING COMMUNICATION NETWORKS," and assigned to the assignee hereof.

FIELD

Certain aspects of the present disclosure generally relate to wireless communications, and more particularly, to methods and apparatuses for reusing wireless communication resources in neighboring communication networks.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of managing reuse of a wireless medium. The method includes determining, at an access point, whether to allow reuse of the wireless medium by one or more stations in a basic service set (BSS). The method further includes transmitting, upon determining to allow reuse, an indication that reuse of the wireless medium can be permitted for stations meeting a criteria. The method further includes determining one or more reuse parameters. The method further includes transmitting the one or more reuse parameters.

In various embodiments, the one or more reuse parameters can include a plurality of reuse parameters that are different for different stations.

In various embodiments, the method can further include selecting a reuse mode comprising one or more of the following conditions either alone or in combination: stations can be permitted to reuse the wireless medium when detecting an overlapping BSS (OBSS) transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device and/or intended receiving device can have an RSSI less than a dynamic threshold that can be a function of one or more preamble parameters. The method can further include transmitting an indication of the selected reuse mode.

In various embodiments, the first threshold and the second threshold can be the same. In various embodiments, the dynamic threshold can be a function of a transmit power of the transmitting device and/or of an intended receiver. In various embodiments, the one or more reuse parameters can include one or more of: a transmit power, an energy detection (ED) level, a transmitter received signal strength indication (RSSI) threshold, an intended receiver RSSI threshold, a RSSI threshold function based on one or more preamble parameters, and an indication of an amount of interference tolerated at nodes as a function of one or more parameters.

In various embodiments, determining whether to allow reuse of the wireless medium can be based on a BSS distance of an access point and/or a BSS distance of the one or more stations. In various embodiments, the method can further include determining to allow reuse of the wireless medium and using enhanced request-to-send and/or enhanced clear-to-send transmissions. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the access point can have multiple BSS identifiers, the method further comprising signaling one or more colors to which the one or more stations should defer, or selecting the same color as a neighboring access point.

In various embodiments, the one or more reuse parameters comprise one or more of a transmit power, an energy detection (ED) level, a transmitter received signal strength indication (RSSI) threshold, an intended receiver RSSI threshold, an RSSI threshold function based on one or more parameters, the one or more parameters including a transmit power or other parameters included in a preamble of received packets, and an indication of an amount of interference tolerated at nodes as a function of one or more parameters.

In various embodiments, determining whether to allow reuse of the wireless medium is based on a BSS distance of an access point and/or a BSS distance of the one or more stations. In various embodiments, the criteria defines that all stations in the BSS are allowed to reuse the wireless medium, or a subset of stations in the BSS are allowed to reuse the wireless medium, wherein the subset of stations are based on the BSS distance of each of the one or more stations. In various embodiments, the access point has multiple BSS identifiers, the method further comprising signaling one or more BSS identifiers to which the one or more stations should defer, or choosing all the BSS identifiers to share the same color.

Another aspect provides an apparatus configured to manage reuse of a wireless medium. The apparatus includes a processor configured to determine whether to allow reuse of the wireless medium by one or more stations in a basic service set (BSS). The processor is further configured to determine one or more reuse parameters. The apparatus further includes a transmitter configured to transmit, upon determining to allow reuse, an indication that reuse of the wireless medium can be permitted for stations meeting a criteria. The transmitter is further configured to transmit the one or more reuse parameters.

In various embodiments, the one or more reuse parameters can include a plurality of reuse parameters that are different for different stations.

In various embodiments, the processor can be further configured to select a reuse mode comprising one or more of the following conditions either alone or in combination: stations can be permitted to reuse the wireless medium when detecting an overlapping BSS (OBSS) transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device and/or intended receiving device can have an RSSI less than a dynamic threshold that can be a function of one or more preamble parameters. The transmitter can be further configured to transmit an indication of the selected reuse mode.

In various embodiments, the first threshold and the second threshold can be the same. In various embodiments, the dynamic threshold can be a function of a transmit power of the transmitting device and/or of an intended receiver. In various embodiments, the one or more reuse parameters can include one or more of: a transmit power, an energy detection (ED) level, a transmitter received signal strength indication (RSSI) threshold, an intended receiver RSSI threshold, a RSSI threshold function based on one or more preamble parameters, and an indication of an amount of interference tolerated at nodes as a function of one or more parameters.

In various embodiments, the processor can be configured to determine whether to allow reuse of the wireless medium based on a BSS distance of an access point and/or a BSS distance of the one or more stations. In various embodiments, the processor can be further configured to determine to allow reuse of the wireless medium and to use enhanced request-to-send and/or enhanced clear-to-send transmissions. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the apparatus can include an access point having multiple BSS identifiers, and wherein the processor can be further configured to signal one or more colors to which the one or more stations should defer, or to select the same color as a neighboring access point.

Another aspect provides another apparatus for managing reuse of a wireless medium. The apparatus includes means for determining whether to allow reuse of the wireless medium by one or more stations in a basic service set (BSS). The apparatus further includes means for transmitting, upon determining to allow reuse, an indication that reuse of the wireless medium can be permitted for stations meeting a criteria. The apparatus further includes means for determining one or more reuse parameters. The apparatus further includes means for transmitting the one or more reuse parameters.

In various embodiments, the one or more reuse parameters can include a plurality of reuse parameters that are different for different stations.

In various embodiments, the apparatus can further include means for selecting a reuse mode comprising one or more of the following conditions either alone or in combination: stations can be permitted to reuse the wireless medium when detecting an overlapping BSS (OBSS) transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device and/or intended receiving device can have an RSSI less than a dynamic threshold that can be a function of one or more preamble parameters. The apparatus can further include means for transmitting an indication of the selected reuse mode.

In various embodiments, the first threshold and the second threshold can be the same. In various embodiments, the dynamic threshold can be a function of a transmit power of the transmitting device and/or of an intended receiver. In various embodiments, the one or more reuse parameters can include one or more of: a transmit power, an energy detection (ED) level, a transmitter received signal strength indication (RSSI) threshold, an intended receiver RSSI threshold, a RSSI threshold function based on one or more preamble parameters, and an indication of an amount of interference tolerated at nodes as a function of one or more parameters.

In various embodiments, determining whether to allow reuse of the wireless medium can be based on a BSS distance of an access point and/or a BSS distance of the one or more stations. In various embodiments, the apparatus can further include means for determining to allow reuse of the wireless medium and using enhanced request-to-send and/or enhanced clear-to-send transmissions. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the apparatus can include an access point having multiple BSS identifiers, the apparatus further comprising means for signaling one or more colors to which the one or more stations should defer, or selecting the same color as a neighboring access point.

Another aspect provides a non-transitory computer-readable medium. The medium includes code that, when executed, causes an apparatus to comprising code that, when executed, causes an apparatus to determine whether to allow reuse of the wireless medium by one or more stations in a basic service set (BSS). The medium further includes code that, when executed, causes the apparatus to transmit, upon determining to allow reuse, an indication that reuse of the wireless medium can be permitted for stations meeting a criteria. The medium further includes code that, when executed, causes the apparatus to determine one or more reuse parameters. The medium further includes code that, when executed, causes the apparatus to transmit the one or more reuse parameters.

In various embodiments, the one or more reuse parameters can include a plurality of reuse parameters that are different for different stations.

In various embodiments, the medium can further include code that, when executed, causes the apparatus to select a reuse mode comprising one or more of the following conditions either alone or in combination: stations can be permitted to reuse the wireless medium when detecting an overlapping BSS (OBSS) transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device and/or intended receiving device can have an RSSI less than a dynamic threshold that can be a function of one or more preamble parameters. The medium can further include code that, when executed, causes the apparatus to transmit an indication of the selected reuse mode.

In various embodiments, the first threshold and the second threshold can be the same. In various embodiments, the dynamic threshold can be a function of a transmit power of the transmitting device and/or of an intended receiver. In various embodiments, the one or more reuse parameters can include one or more of: a transmit power, an energy detection (ED) level, a transmitter received signal strength indication (RSSI) threshold, an intended receiver RSSI threshold, a RSSI threshold function based on one or more preamble parameters, and an indication of an amount of interference tolerated at nodes as a function of one or more parameters.

In various embodiments, the medium can further include code that, when executed, causes the apparatus to determine whether to allow reuse of the wireless medium based on a BSS distance of an access point and/or a BSS distance of the one or more stations. In various embodiments, the medium can further include code that, when executed, causes the apparatus to determine to allow reuse of the wireless medium and to use enhanced request-to-send and/or enhanced clear-to-send transmissions. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the apparatus can include an access point having multiple BSS identifiers, further comprising code that, when executed, causes the apparatus to signal one or more colors to which the one or more stations should defer, or to select the same color as a neighboring access point.

Another aspect provides another method of reusing a wireless medium. The method includes detecting, at a station, an overlapping basic service set (OBSS) transmission. The method further includes determining whether to reuse the wireless medium. The method further includes determining one or more reuse parameters. The method further includes selectively transmitting a message based on said determining whether to reuse the wireless medium and the one or more reuse parameters.

In various embodiments, the method can further include selecting a reuse mode comprising one or more of the following conditions either alone or in combination: stations can be permitted to reuse the wireless medium when detecting the OBSS transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device can have an RSSI less than a dynamic threshold that can be a function of one or more preamble parameters. The method further includes applying the selected reuse mode.

In various embodiments, the first threshold and the second threshold can be the same. In various embodiments, the one or more reuse parameters can include one or more of: a transmit power, an energy detection (ED) level, a transmitter received signal strength indication (RSSI) threshold, a receiver RSSI threshold, a RSSI threshold function based on one or more preamble parameters, and an indication of an amount of interference tolerated at nodes as a function of one or more parameters. In various embodiments, determining whether to reuse the wireless medium can be based on a BSS distance of an access point and/or a BSS distance of the station. In various embodiments, the method can further include determining to reuse the wireless medium and using enhanced request-to-send and/or enhanced clear-to-send transmissions.

In various embodiments, the method can further include receiving an indication that reuse of the wireless medium can be permitted for stations meeting a criteria. In various embodiments, the criteria can define that all stations in the BSS can be allowed to reuse the wireless medium. In various embodiments, the criteria can define that a subset of stations in the BSS can be allowed to reuse the wireless medium.

In various embodiments, the subset of stations can be based on their BSS distance. In various embodiments, the one or more parameters can be defined in the OBSS transmission.

Another aspect provides another apparatus configured to reuse a wireless medium. The apparatus includes a processor configured to detect an overlapping basic service set (OBSS) transmission. The processor is further configured to determine whether to reuse the wireless medium. The processor is further configured to determine one or more reuse parameters. The apparatus further includes a transmitter configured to selectively transmit a message based on said determining whether to reuse the wireless medium and the one or more reuse parameters.

In various embodiments, the one or more reuse parameters can include a plurality of reuse parameters that are different for different stations.

In various embodiments, the processor can be further configured to select a reuse mode comprising one or more of the following conditions either alone or in combination: stations can be permitted to reuse the wireless medium when detecting the OBSS transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device can have an RSSI less than a dynamic threshold that can be a function of one or more preamble parameters. The processor can be further configured to apply the selected reuse mode.

In various embodiments, the first threshold and the second threshold can be the same. In various embodiments, the one or more reuse parameters can include one or more of: a transmit power, an energy detection (ED) level, a transmitter received signal strength indication (RSSI) threshold, a receiver RSSI threshold, a RSSI threshold function based on one or more preamble parameters, and an indication of an amount of interference tolerated at nodes as a function of one or more parameters. In various embodiments, the processor can be configured to determine whether to reuse the wireless medium based on a BSS distance of an access point and/or a BSS distance of the station.

In various embodiments, the processor can be further configured to determine to reuse the wireless medium and to use enhanced request-to-send and/or enhanced clear-to-send transmissions. In various embodiments, the apparatus can further include a receiver configured to receive an indication that reuse of the wireless medium can be permitted for stations meeting a criteria. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the one or more parameters can be defined in the OBSS transmission.

Another aspect provides another apparatus for reusing a wireless medium. The apparatus includes means for detecting an overlapping basic service set (OBSS) transmission. The apparatus includes means for determining whether to reuse the wireless medium. The apparatus includes means for determining one or more reuse parameters. The apparatus includes means for selectively transmitting a message based on said determining whether to reuse the wireless medium and the one or more reuse parameters.

In various embodiments, the one or more reuse parameters can include a plurality of reuse parameters that are different for different stations.

In various embodiments, the apparatus can further include means for selecting a reuse mode comprising one or more of the following conditions either alone or in combination: stations can be permitted to reuse the wireless medium when detecting the OBSS transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device can have an RSSI less than a dynamic threshold that can be a function of one or more preamble parameters. The apparatus can further include means for applying the selected reuse mode.

In various embodiments, the first threshold and the second threshold can be the same. In various embodiments, the one or more reuse parameters can include one or more of: a transmit power, an energy detection (ED) level, a transmitter received signal strength indication (RSSI) threshold, a receiver RSSI threshold, a RSSI threshold function based on one or more preamble parameters, and an indication of an amount of interference tolerated at nodes as a function of one or more parameters. In various embodiments, determining whether to reuse the wireless medium can be based on a BSS distance of an access point and/or a BSS distance of the station.

In various embodiments, the apparatus can further include means for determining to reuse the wireless medium and to use enhanced request-to-send and/or enhanced clear-to-send transmissions. In various embodiments, the apparatus can further include receiving an indication that reuse of the wireless medium can be permitted for stations meeting a criteria. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the one or more parameters can be defined in the OBSS transmission.

Another aspect provides another non-transitory computer-readable medium. The medium includes code that, when executed, causes an apparatus to detect an overlapping basic service set (OBSS) transmission. The medium further includes code that, when executed, causes the apparatus to determine whether to reuse the wireless medium. The medium further includes code that, when executed, causes the apparatus to determine one or more reuse parameters. The medium further includes code that, when executed, causes the apparatus to selectively transmit a message based on said determining whether to reuse the wireless medium and the one or more reuse parameters.

In various embodiments, the one or more reuse parameters can include a plurality of reuse parameters that are different for different stations.

In various embodiments, the medium can further include code that, when executed, causes the apparatus to select a reuse mode comprising one or more of the following conditions either alone or in combination: stations can be permitted to reuse the wireless medium when detecting the OBSS transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device can have an RSSI less than a dynamic threshold that can be a function of one or more preamble parameters. The medium further includes code that, when executed, causes the apparatus to apply the selected reuse mode.

In various embodiments, the first threshold and the second threshold can be the same. In various embodiments, the one or more reuse parameters can include one or more of: a transmit power, an energy detection (ED) level, a transmitter received signal strength indication (RSSI) threshold, a receiver RSSI threshold, a RSSI threshold function based on one or more preamble parameters, and an indication of an amount of interference tolerated at nodes as a function of one or more parameters. In various embodiments, determining whether to reuse the wireless medium can be based on a BSS distance of an access point and/or a BSS distance of the station.

In various embodiments, the medium can further include code that, when executed, causes the apparatus to determine to reuse the wireless medium and to use enhanced request-to-send and/or enhanced clear-to-send transmissions. In various embodiments, the medium can further include code that, when executed, causes the apparatus to receive an indication that reuse of the wireless medium can be permitted for stations meeting a criteria. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the one or more parameters can be defined in the OBSS transmission.

DETAILED DESCRIPTION

Figure 1:
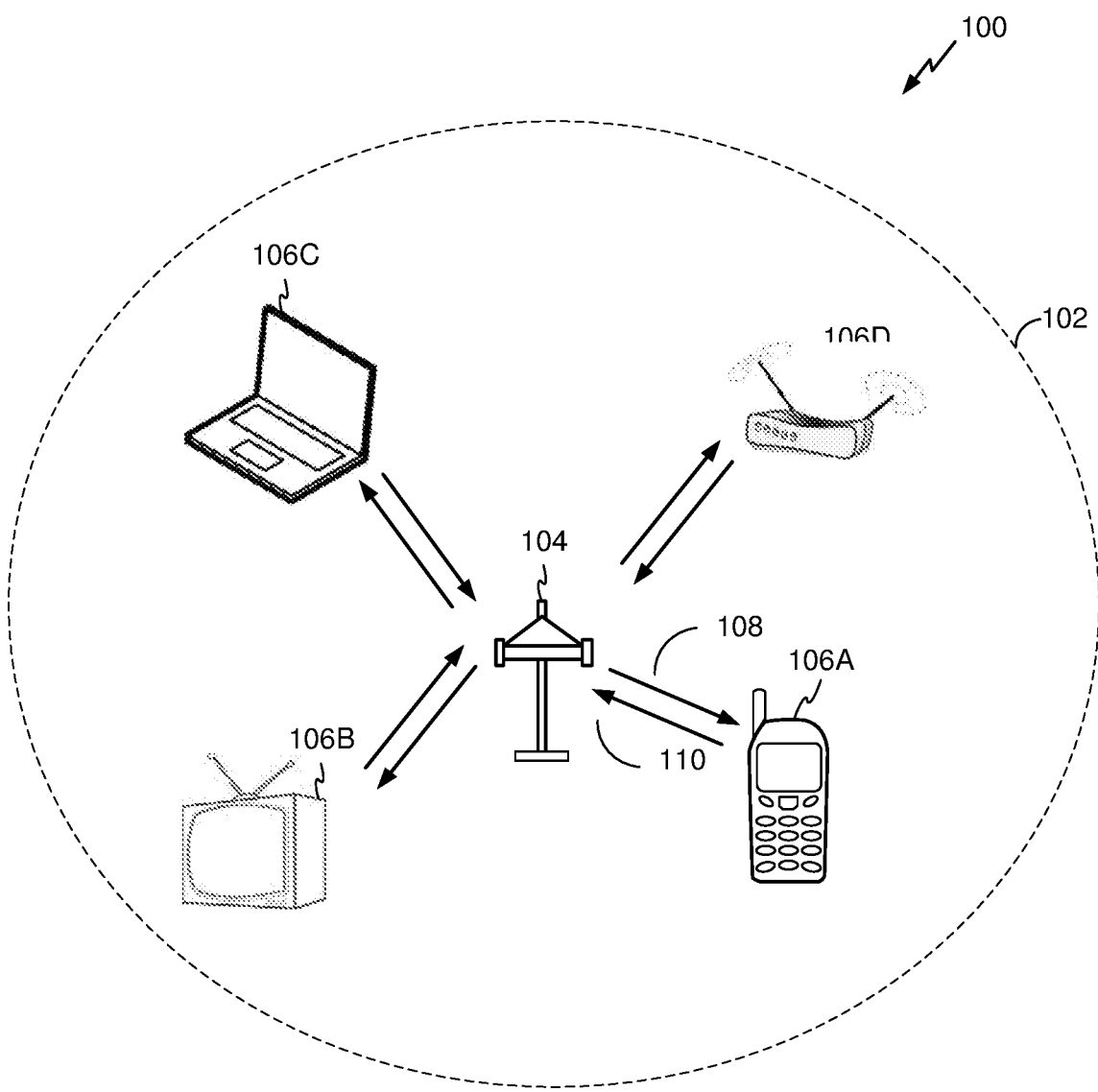
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein it will be appreciated that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to, or other than, the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes such as multiple-input and multiple-output (MIMO).

In some implementations, a WLAN includes various devices that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In some aspects, an STA connects to an AP via a Wi-Fi (e.g., IEEE 802.11 protocol such as 802.11ax) compliant wireless link to obtain general connectivity to the Internet or to other wide area networks (WAN). In some implementations an STA can also be used as an AP.

The techniques described herein can be used for various broadband wireless communication systems, including communication systems that are based on an orthogonal multiplexing scheme, such as Orthogonal Frequency Division Multiple Access (OFDMA). An OFDMA system utilizes orthogonal frequency division multiplexing (OFDM), which is a modulation technique that partitions the overall system bandwidth into multiple orthogonal sub-carriers. These sub-carriers can also be called tones, bins, etc.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to an IEEE 802.11 wireless standard such as, for example, the 802.11ax standard. The wireless communication system 100 can include an AP 104, which communicates with STAs 106A-D (referred to herein as "STA 106" or "STAs 106").

A variety of processes and methods can be used for transmissions in the wireless communication system 100 between the AP 104 and the STAs 106. For example, in some aspects signals can be transmitted and received between the AP 104 and the STAs 106 in accordance with OFDMA techniques. In accordance with these aspects, the wireless communication system 100 can be referred to as an OFDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the associated STAs 106 that use the AP 104 for communication can be referred to as a basic service set (BSS). Associated STAs 106 may refer to one or more associated station (e.g., STA 106A) that has performed an association procedure with the AP 104. It should be noted that the wireless communication system 100 may not have a central AP 104, and may alternatively function as a peer-to-peer network between/among the STAs 106. Accordingly, the functions of the AP 104 described herein can additionally or alternatively be performed by one or more of the STAs 106.

Figure 2:
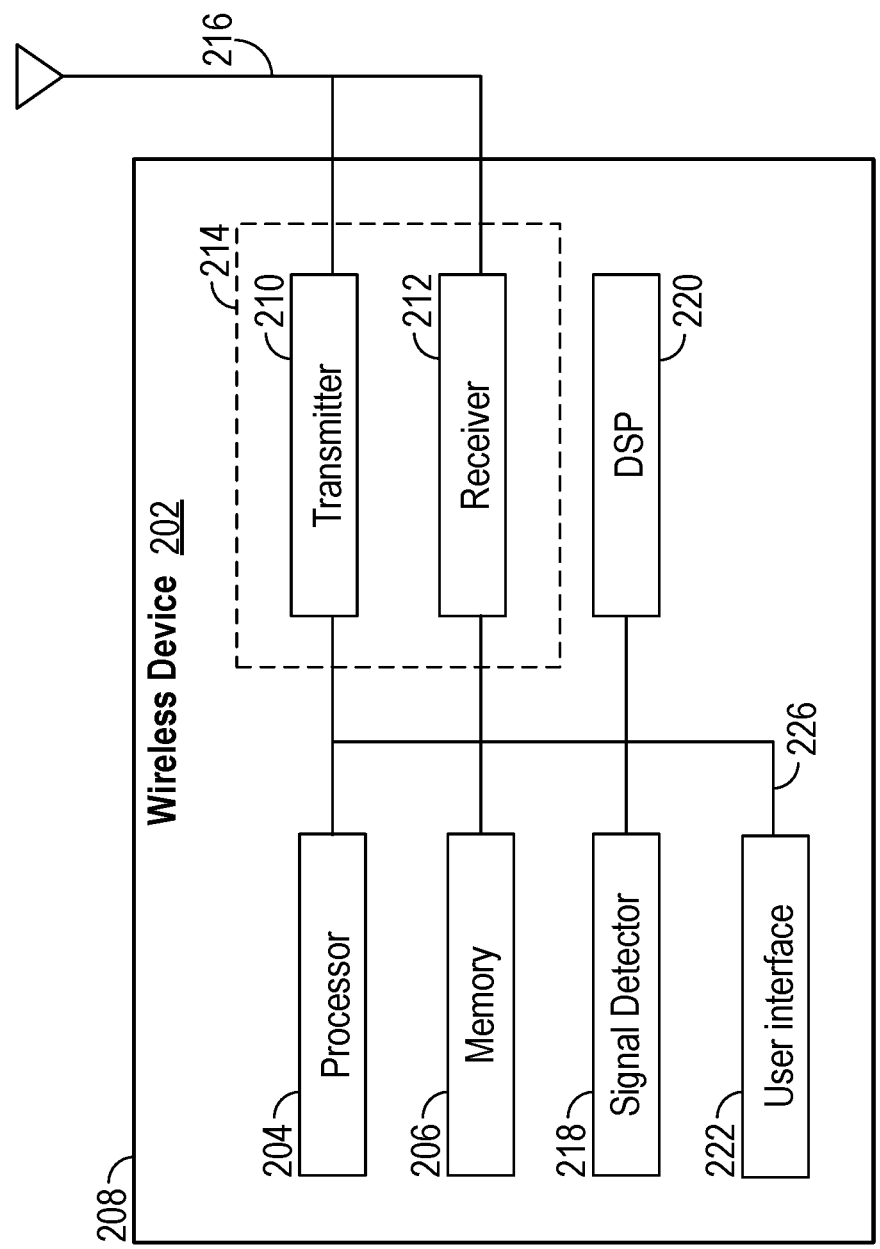
FIG. 2 illustrates various components that can be utilized in a wireless device that can be employed within the wireless communication system of FIG. 1, in accordance with an embodiment.

FIG. 2 illustrates various components that can be utilized in a wireless device 202 that can be employed within the wireless communication system 100 of FIG. 1, in accordance with an embodiment. The wireless device 202 is an example of a device that can be configured to implement the various methods described herein. In some aspects, the wireless device 202 can comprise the AP 104 or one of the STAs 106.

As illustrated, the wireless device 202 can include a processor 204, which may be configured to control the operation of the wireless device 202. The processor 204 can also be referred to as a central processing unit (CPU). As illustrated, the wireless device 202 can also include a memory 206, which can include one or both of read-only memory (ROM) and random access memory (RAM). In some aspects, the memory 206 stores or provides instructions or data that may be utilized by the processor 204. In one aspect, a portion of the memory 206 can also include non-volatile random access memory (NVRAM). The processor 204 can be configured to perform logical and arithmetic operations based on program instructions stored within the memory 206. In various embodiments, the instructions in the memory 206 can be executable (e.g., software) to implement the methods described herein.

In various aspects, the processor 204 can comprise, or be a component of, a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). In various embodiments, the instructions, when executed by the one or more processors, cause the processing system to perform the various functions described herein.

The wireless device 202 can also include a housing 208, which can include a transmitter 210 and a receiver 212 to allow transmission and reception of data between the wireless device 202 and a remote location. In some aspects, the transmitter 210 and the receiver 212 can be combined into a transceiver 214. In various aspects, an antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

As illustrated, the wireless device 202 can also include a signal detector 218 that can be used to detect and quantify the level of signals received by the transceiver 214. In some aspects, the signal detector 218 can detect the received signals as total energy, energy per subcarrier per symbol, power spectral density and other signals. As illustrated, the wireless device 202 can also include a digital signal processor (DSP) 220 for use in processing signals. In various aspects, the DSP 220 can be configured to generate a data unit for transmission. In some aspects, the generated data unit can comprise a physical layer data unit (PPDU), which may also be referred to as a "packet," a "message" or a "frame."

As illustrated, the wireless device 202 can further comprise a user interface 222. In some aspects, the user interface 222 can comprise a keypad, a microphone, a speaker, or a display. In accordance with various embodiments, the user interface 222 can include any element or component that conveys information to a user of the wireless device 202 or receives input from the user.

As illustrated, the various components of the wireless device 202 can be coupled together by a system bus 226. The system bus 226 can include a data bus, for example, as well as a power bus, a control signal bus, or a status signal bus in addition to the data bus. In various aspects, the components of the wireless device 202 can be coupled together, or accept or provide inputs to each, other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 or the DSP 220. Further, each of the components illustrated in FIG. 2 can be implemented using a plurality of separate elements.

As discussed above, the wireless device 202 can comprise an AP 104 or an STA 106, and can be used to transmit and/or receive data. In some aspects, the data units exchanged between the AP 104 and the STAs 106 can include data frames, control frames, and/or management frames. Data frames can be used for transmitting data from an AP 104 or a STA 106 to other APs 104 or STAs 106. Control frames can be used together with data frames for performing various operations or for reliably delivering data (e.g., acknowledging receipt of data, polling of APs, area-clearing operations, channel acquisition, carrier-sensing maintenance functions, etc.). In some aspects, management frames can be used for various supervisory functions (e.g., for joining and departing from wireless networks, etc.).

Conditions for Reuse of Wireless Resources Between Overlapping Basic Service Sets Various mechanisms for wireless resource reuse are described herein. In some embodiments, a wireless device (such as the STA 106A or the AP 104 of FIG. 1) that has data for transmission can monitor the wireless medium in order to determine whether the medium is free for transmission. If the wireless device detects a competing transmission, the wireless device can still reuse the wireless medium (by proceeding with its own transmission without deferral to the detected packet transmission) under one or more conditions discussed herein. Various embodiments of wireless medium reuse are described in U.S. application Ser. No. 14/487,019, filed Sep. 15, 2014; and U.S. application Ser. No. 14/265,112, filed Apr. 29, 2014, the entirety of each of which is hereby incorporated by reference.

For example, the wireless device can determine whether the detected transmission is an inter-basic service set (BSS) or intra-BSS transmission based on a BSS color indication (for example, in a signal field such as SIG A) or based on a media access control (MAC) address in a MAC header of the transmission. If the detected transmission is an inter-BSS frame, and various other conditions discussed herein are met, the wireless device can apply an overlapping BSS (OBSS) packet detection (PD) level that is greater than a minimum receive sensitivity level. Accordingly, when the proper conditions are met, the wireless device can refrain from deferring to OBSS packets by applying a higher threshold during clear channel assessment (CCA). Various embodiments of an AP changing CCA thresholds are described in U.S. application Ser. No. 14/326,312, filed Jul. 8, 2014, the entirety of which is hereby incorporated by reference.

As discussed herein, the AP 104 (FIG. 1) can provide the conditions under which the OBSS PD level should be applied (referred to herein as "OBSS conditions"), and the OBSS PD level itself, to the STAs 106A-106D. For example, the AP 104 can provide the OBSS conditions in a message such as a beacon, a broadcast information element (IE), or any other wireless communication. Various examples of such conditions are discussed with respect to FIG. 3.

Adjusting Deferral Parameters

Figure 3:
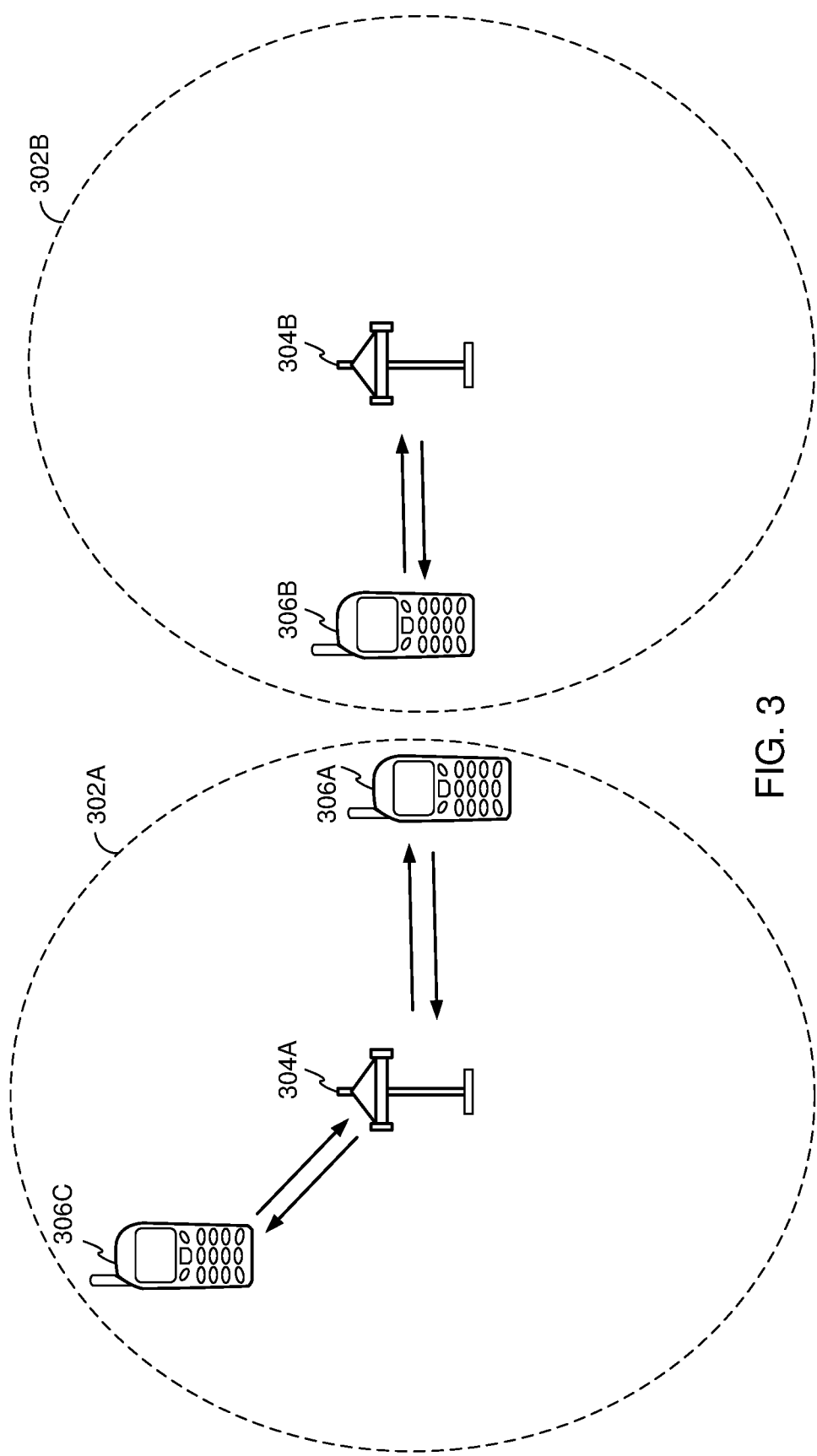
FIG. 3 is an exemplary illustration of two access points and the associated devices in each basic service set, in accordance with an embodiment.

FIG. 3 is an exemplary illustration of two access points and the associated devices in each respective BSS, in accordance with an embodiment. As noted above, the BSS may refer to an AP 104 along with the associated STAs 106 that use the AP 104 for communication. For example, as illustrated, the AP 304A may have a BSS 302A, which comprises associated STAs 306A and 306C. In some aspects, the phrase "BSS" may refer to the area which the AP 304A services. Although illustrated here as a circle, this coverage of the BSS 302A is merely illustrative.

The AP 304A may be associated with any number of different STAs. For example, the AP 304A may be associated with more or less than the two illustrated STAs 306A, 306C. Within some geographical proximity to the AP 304A, there may also be other APs, such as AP 304B. The AP 304B may have a BSS, such as BSS 302B, which may comprise one or more STAs, such as STA 306B. Although the BSS of the AP 304A and the AP 304B are not illustrated as overlapping, in some aspects, the BSS 302A from one AP 304A may overlap with the BSS 302B from another AP 304B, or the BSA (not illustrated) of one AP 304A may overlap with the BSA of another AP 304B. In dense deployments, there may be a large number of overlapping BSSes from various APs (also referred to herein as a plurality of wireless communication networks). Each of the BSSes may be based on the same protocols, such as a particular IEEE 802.11 protocol, or may be based on different protocols. Similarly, these BSSes may use the same portion of the spectrum, such as using the same channel (e.g., overlapping or partially overlapping), or may use adjacent or different channels. In some aspects, a channel may comprise a bandwidth, and the bandwidth may be regarded as comprising more than one sub-band (e.g., 5 MHz, 10 MHz, 20 MHz, 40 MHz, 80 MHz, etc.). In accordance with these aspects, OBSSes may be regarded as utilizing overlapping or partially overlapping bandwidths or sub-bands of a channel, or adjacent or different sub-bands of a channel.

In some aspects, deferral rules may be used by devices within a BSS to determine when to defer to other traffic on the wireless medium, when to transmit on the wireless medium, how long to wait before attempting to access the wireless medium, etc. In some aspects, a BSS may achieve better performance if the devices in that BSS have an easier time accessing the wireless medium, such as, for example, when the deferral rules for the BSS have been loosened or made less stringent.

Loosening deferral rules may take multiple forms. For example, in some aspects, clear channel assessment thresholds may be increased. In accordance with these aspects, before a device, such as a STA 106 or an AP 104, transmits on the wireless medium, that device may perform a clear channel assessment (CCA). This CCA may include, for example, determining an average amount of energy that is present on a particular portion of the channel during a particular time or time frame. The device may compare the detected amount of energy to a threshold, in order to determine whether or not the wireless medium is in use. For example, if there is a large amount of energy in the spectrum at a particular time, the device may determine that this portion of the spectrum is in use, and may choose not to transmit on this portion of the spectrum at that time. Accordingly, this threshold may be altered, in order to allow devices to transmit even when larger amounts of energy are present on the wireless medium, or to forbid devices from transmitting when lower amounts of energy are present. Accordingly, adjusting this threshold, depending upon the direction of the adjustment, may be referred to herein as "loosening" or "tightening" the deferral rules for a BSS, as it may make devices either more or less likely to defer to the traffic present on the wireless medium.

In another aspect, deferral rules for a BSS may be loosened to allow devices to transmit on top of packets which they detect when those packets are from an overlapping basic service set (OBSS). For example, from the point of view of a device in the BSS 302A such as STA 306A, the BSS 302B may be thought of as an OBSS. Specifically, for example, STA 306A may be close enough to STA 306B or AP 304B that each of the two devices may be able to receive communications from the other (e.g., when BSS 302A and BSS 302B are using one or more of the same channels and technologies). However, a BSS may adjust its rules, in accordance with one aspect, such that when the STA 306A detects a transmission, and detects that this transmission is from the STA 306B, the AP 304B, or another device in the OBSS (e.g., BSS 302B), the STA 306A may still use the wireless medium, as long as a detected energy is below a certain threshold. Accordingly, making the adjustment above to allow the STA 306A to use the medium more often despite other medium use may also be referred to herein as loosening a deferral rule. In some aspects, loosening of deferral rules may be done for an entire BSS. For example, the AP 304A may transmit a message to each device within the BSS 302A, informing those devices of the deferral rules for the BSS 302A. In some aspects, the AP 304A may additionally or alternatively broadcast a message in the beacon frame, or using a management frame. In some aspects, the loosening of the deferral rules may only apply to certain devices, for example if those devices have a BSS distance that is above a threshold.

In some aspects, a BSS may achieve better performance with less stringent deferral rules when, for example, there are fewer nearby OBSSes. For example, deferral rules may be loosened when there are no "contiguous" BSSes on the same channel. For example, if a BSS is far enough away from neighboring (e.g., within a specified geographical distance) OBSSes on the same channel, deferral rules may be loosened. Similarly, there may be situations in which a BSS may achieve better performance with more stringent deferral rules. For example, when a large number of BSSes overlap, use the same channel, and carry a large amount of traffic, it may be beneficial to use more stringent (e.g., "tightened") deferral rules in order to reduce packet collisions which may render packets un-receivable. For example, tightening deferral rules may include decreasing one or more CCA thresholds (also referred to herein as a clear channel assessment threshold). In some aspects, an AP may be configured to switch to a primary channel that is not aligned with most of its neighbors when it determines that neighboring BSSes are using the same, or overlapping, channels. Although this switching process may not be considered a deferral rule, it may be useful in lieu of, or in addition to, making deferral rules more or less stringent. Accordingly, methods and apparatus for enabling a BSS to adjust the stringency of its deferral rules or switching channels based on the proximity of OBSSes or how active or inactive the OBSSes are described. In some aspects, there may be one or more neighboring OBSSes, which may also be referred to herein as a plurality of neighboring wireless communication networks.

Three Reuse Modes

In various embodiments, the AP 304A can be configured to indicate at least one of three example reuse modes in which the STA 306A can determine whether to defer to OBSS transmissions. In a first mode, the STA 306A can be configured to defer to a transmission from STA 306B when a received signal strength indication (RSSI) in the preamble of the transmission from STA 306B is greater than or equal to a threshold (Thresh_OBSS). Accordingly, in the first reuse mode, the STA 306A can be configured to reuse the wireless medium when the RSSI of the transmission from STA 306B is less than Thresh_OBSS.

In the second reuse mode, as in the first reuse mode, the STA 306A can be configured to defer to a transmission from STA 306B when a received signal strength indication (RSSI) in the preamble of the transmission from STA 306B is greater than or equal to Thresh_OBSS. Moreover, the STA 306A can be configured to defer to the transmission from STA 306B based on an RSSI associated with the intended receiver of the transmission. For example, the STA 306A can monitor transmissions from other devices and can keep a record of observed RSSI from each device. Thus, in an embodiment where the STA 306B transmits a packet to the AP 304B, the STA 306A can further determine whether to defer to the transmission if the previously observed RSSI of the AP 304B is greater than or equal to a threshold (Thresh_OBSS_RX). In some embodiments, Thresh_OBSS can be the same as, or equal to, Thresh_OBSS_RX. STA 306A can also get the RSSI of the intended receiver of packet, in this case AP 304B, if AP 304B sends a clear to send (CTS). Various embodiments of deferral according to the second reuse mode are described in U.S. application Ser. No. 14/268,829, filed May 2, 2014; U.S. application Ser. No. 14/268,855, filed May 2, 2014; and U.S. application Ser. No. 14/268,830, filed May 2, 2014; the entirety of each of which is hereby incorporated by reference (collectively referred to herein as "References 141289"). Although References 141289 discuss looking at the RSSI from the receiver of the intended packet when deciding whether to reuse the wireless medium during the packet transmission itself, various embodiments of the second reuse mode provided herein are not restricted to reuse only for the length of the packet.

In the third reuse mode, in various embodiments, the STA 306A can be configured to defer to a transmission from STA 306B based on the conditions of the first reuse mode and/or the second reuse mode. Additionally, or alternatively, the STA 306A can be configured to selectively defer or reuse the wireless medium based on additional requirements inside a preamble, an enhanced request-to-send (eRTS), or an enhanced clear-to-send (eCTS). In other words, Thresh_OBSS can be a function of one or more preamble parameters (Thresh_OBSS(pp)). For example, in embodiments where a modulation coding scheme (MCS) is defined in the preamble, Thresh_OBSS can be a function of the MCS. In various embodiments, the function can be preset or defined by the AP 304A. In some embodiments, the preamble can state how much interference is tolerated, and the Thresh_OBSS can be computed from that information. In some embodiments, the transmitter may lower its power in order to meet the interference requirement. Various embodiments of deferral according to the third reuse mode are described in References 141289. Various embodiments of eRTS and eCTS, which can also be referred to as OBSS request to send (RTS) and OBSS CTS in some embodiments, are described in U.S. Provisional Application No. 62/052,402, filed Sep. 18, 2014; and U.S. Provisional Application No. 62/157,898, filed May 6, 2015, the entirety of each of which is hereby incorporated by reference.

Controlling Reuse Enablement—All STAs

In one embodiment, the AP 304A can allow wireless medium reuse for all STAs in the BSS 302A. Thus, the AP 304A can signal reuse to all STAs. In some embodiments, only one of the three reuse modes discussed herein is available. In embodiments where more than one reuse mode is available, the AP 304A can signal which reuse mode the STA 306A should apply. The AP 304A can further signal all relevant thresholds to the selected reuse mode. For example, the AP 304A can signal the energy detection (ED) level, OBSS_Thresh, OBSS_Thresh_RX (when different from OBSS_Thresh), OBSS_Thresh(pp) (when the thresholds for OBSS packets are a function of parameters in the preamble, eRTS, and/or eCTS, etc.), an indication of an amount of interference tolerated at nodes as a function of one or more parameters (such as MCS), and so on.

In an embodiment, APs can selectively allow or disallow reuse of the wireless medium based on a "BSS distance." The BSS distance can be a metric, such as a ratio, which conveys information about the relatively distance of the STAs in the BSS as compared to the distance to neighboring BSSes which operate on the same channel as the BSS. For example, this distance may be a ratio which conveys information about the relative distance of STA 306A and STA 306C, compared to the distance from AP 304A to AP 304B.

There may be several possible ways of calculating the "distance" between two BSSes (also referred to herein as "BSS distance"), in order to determine the proximity of OBSSes. The simplest method of doing this may be to simply measure the distance between two APs, such as the APs 304A and 304B for example. However, this measurement may be insufficient. As illustrated in FIG. 3, the APs 304A and 304B may be some distance from each other, however, their BSSes may still be contiguous because of how close STA 306A and STA 306B are to one another. Due to the proximity of STA 306A and STA 306B, transmissions to or from one of these devices (e.g., STA 306A) may be interrupted by transmission to or from the other device (e.g., STA 306B). In some aspects, this proximity may be overlooked if a BSS distance is measured solely by determining a distance between two APs. Accordingly, it may be desirable to have more nuanced and sophisticated measures of BSS distance. Accordingly, more sophisticated BSS distance measurement methods and apparatus may provide additional information about how far apart the STAs in one BSS are from the STAs in another BSS.

For example, BSS distance may be determined in a number of ways. It will be appreciated that each of these described options may be "mixed and matched" to some extent. For example, certain measures may use averages, or may use values specific to a STA that is the furthest away from its associated AP. In some aspects, each of the described options may use received signal strength indication (RSSI) measurements instead of distance measurements. In accordance with these aspects, the described formulas may need to be adjusted when RSSI is used instead of distance. Any of the measurement options described herein may be used interchangeably by changing the metric in a suitable manner.

A first option for calculating a BSS distance may be calculating the distance from the AP in a BSS to the nearest OBSS AP that operates on the same channel, divided by the distance from the AP in the BSS to the furthest STA in the BSS. For example, in FIG. 3, the APs 304A and 304B may be 100 meters apart from one another, and the STA 306A of BSS 302A may be the furthest STA from the AP 304A at a distance of 40 meters from the AP 304A. Accordingly, in one aspect the BSS distance measurement may be 100 meters divided by 40 meters, or 2.5.

Another option for calculating a BSS distance may be to take an average (or expected value), for each STA in a BSS, of the distance from that STA to the nearest neighboring OBSS AP, divided by the distance from the STA to the AP of its own BSS. For example, in FIG. 3, STA 306A may be 60 meters from AP 304B, which may be the nearest neighboring OBSS AP to STA 306A. STA 306A may also be 40 meters from AP 304A, which is the AP that STA 306A is associated with. Accordingly, the BSS distance, as calculated for STA 306A, may be 60 meters divided by 40 meters, or 1.5. This ratio may be calculated for each AP in BSS 302A, and the ratios may then be averaged to calculate a BSS distance for BSS 302A.

Another option for calculating a BSS distance may be to take the distance between station "x" and its nearest neighboring OBSS AP, divided by the distance from station "x" to the BSS AP that it is associated with, where station "x" is the STA in the BSS which is furthest from the AP. For example, in FIG. 3, STA 306A may be the station in BSS 302A which is furthest from AP 304A. As before, STA 306A may be 60 meters from the nearest OBSS AP, which may be AP 304B, and STA 306A may be 40 meters from the AP in its BSS, which is AP 304A. Thus, this ratio may be calculated by dividing 60 meters by 40 meters, which is 1.5. In some aspects, this formula may be altered by, for example, calculating this ratio for some number of STAs in the BSS. For example, this may be calculated based upon the furthest 1, 2, 4, 5, or some other number of STAs. This ratio may also be calculated for each STA, and the lowest ratio in the BSS may be used, or an average of the lowest 2, 3, 4, 5 or some other number of BSSes.

Another method of calculating BSS distance may be based, at least in part, on the BSS distance to a particular OBSS. To get a final BSS distance, these OBSS distances can be averaged, or the minimum value can be taken. As another example, the BSS distance of BSS 302A may be based on the distance between an AP 304A and its nearest neighboring OBSS AP in the same channel, such as AP 304B. For example, a BSS distance may be calculated based on the distance from an AP to its nearest neighboring same-channel OBSS AP, divided by the mean distance between the AP and all STAs in that AP's BSS. For example, AP 304A may be 100 meters from AP 304B. STA 306A and 306C may be 40 and 20 meters from AP 304A, respectively. If these two STAs are the only STAs in BSS 302A, the mean distance between AP 304A and STAs in BSS 302A may be 30 meters. Thus, this BSS distance may be determined to be 100 meters divided by 30 meters, or 3.33. In some aspects, the denominator of this BSS distance calculation, instead of the mean distance between the AP and all STAs, may be, for example, the distance to the furthest-away STA in the BSS, the median distance between the AP and a STA in the BSS, or another metric. In some aspects, a number of different BSS distances may be calculated in this manner, for each of a number of different neighboring access points. As discussed, a "final" BSS distance may be determined by averaging these BSS distances for each OBSS, or the minimum BSS distance value may be used.

In some aspects, the distance between an AP and a STA, or an AP and another AP, may be determined or approximated using RSSI values. RSSI may be a measurement of the power present in a received radio signal, and, in some aspects, a distance between two wireless devices may be inferred based upon this metric. For example, a received signal strength may be compared to a transmitter signal strength of that device (which may be known), in order to estimate a distance to a device based on the RSSI. This comparison may be performed by the AP 304A, for example. Further, the RSSI value itself may be used directly in the above calculations, provided that the calculations are modified in order to accommodate the use of an RSSI value. For example, the first option for calculating distance may be modified to use an RSSI value by calculating BSS distance as the RSSI (from the AP in the BSS) to the farthest STA in the BSS, divided by the RSSI (from the AP in the BSS) to the nearest OBSS AP on the same channel. When using an RSSI value rather than a distance, it may be advantageous to switch the numerator and the denominator from the distance-based ratios above. This may be true because an RSSI may be inversely-related to a distance between two wireless devices (e.g., the further a STA is from an associated AP, the lower the receiver strength). Accordingly, it may be beneficial to switch the numerator and denominator when using RSSI values rather than distances. In some aspects, a linear value of RSSI may be assumed.

Various other embodiments of determining the BSS distance are described in U.S. application Ser. No. 14/852,395, filed Sep. 11, 2015, the entirety of which is hereby incorporated by reference. In some embodiments, the BSS distance of the AP 304A or 304B can be used. In other embodiments, the BSS distance of the STAs can be used (for example, where they report their BSS distance to the AP 304A).

In some embodiments, the AP 304A can be configured to reuse the wireless medium. In such embodiments, the AP 304A can use eRTS/eCTS for high-efficiency (HE) STAs (such as STAs compliant with 802.11ax). In embodiments where eRTS/eCTS transmissions allow other devices to reuse the wireless medium during those transmissions, the devices can be configured to reuse the wireless medium when the RSSI is below a threshold.

Controlling Reuse Enablement—Some STAs

In one embodiment, the AP 304A can allow wireless medium reuse for some (but not all) STAs in the BSS 302A. Thus, the AP 304A can signal reuse enablement to a subset of STAs. For example, the AP 304A can signal a BSS distance threshold to all STAs, and all STAs who have a BSS distance less than the BSS distance threshold can reuse the wireless medium during OBSS transmissions where the OBSS conditions are met.

In one embodiment, each STA 306A and 306C can compute its own BSS distance. In embodiments where more than one reuse mode is available, the AP 304A can signal which reuse mode the STA 306A should apply. The AP 304A can further signal all relevant thresholds to the selected reuse mode. For example, the AP 304A can signal the energy detection (ED) level, OBSS_Thresh, OBSS_Thresh_RX (when different from OBSS_Thresh), OBSS_Thresh(pp) (when the thresholds for OBSS packets are a function of parameters in the preamble, eRTS, and/or eCTS, etc.), an indication of an amount of interference tolerated at nodes as a function of one or more parameters (such as MCS), and so on.

In some embodiments, the thresholds can be a function of each receiving STAs BSS distance. In another embodiment, the thresholds can be a function of each STAs distance to its own AP, for example via Dynamic Sensitivity Control (DSC). Accordingly, each STA can compute its own threshold based on the APs 304A indications. In some embodiments, transmissions that don't reuse the wireless medium can use legacy RTS/CTS, and transmissions that do reuse the wireless medium, can use eRTS/eCTS.

Controlling Reuse Enablement—STA Decides

In various embodiments, enablement of wireless medium reuse during OBSS transmissions can be determined by each STA. For example, the AP 304A can refrain from signaling threshold. The STAs can be aware of the thresholds in advance, for example they can be stored in a memory. As another example, the thresholds can be provided in the OBSS transmission itself. For example, the STA 306B can provide a minimum interference level in its transmissions. The STA 306A can determine whether or not to reuse the wireless medium based on the provided minimum interference level. It can also change its power in order to meet the interference requirements.

Examples

In various embodiments, a combination of the above embodiments can be employed. For example, in one embodiment the AP 304A can decide whether reuse is enabled based on its BSS distance and each STA can compute OBSS_Thresh based on information in the transmission. As another example, the AP 304A can instruct each STA to use DSC, and each STA can compute OBSS_Thresh based on its distance to the AP 304A. In other embodiments, various other combinations of approaches described herein can be employed.

In another example embodiment, the AP 304A can determine that the nearest AP 304B is farther than distance D. The AP 304A can allow reuse for all STAs in its BSS 302A, so long as STAs do not see any OBSS STAs within distance D2. The AP 304A can send a broadcast IE to STAs 306A and 306C, indicating the condition for reuse, and the OBSS_Thresh if they pass the requirement. Accordingly, for STAs that do not see any OBSS STAs within distance D2, they can reuse the wireless medium based on OBSS_Thresh provided by the AP.

In another example embodiment, the AP 304A can determine that the neighbor AP 304B is farther than distance D. The AP 304A can broadcast a distance D1 to the farthest STA 306C. The AP 304A can listen to neighbor AP's 304B broadcasted distance to their farthest STA 306B. If AP 304A sees that AP's 304B farthest STA 306B is less than D2, and if D1 is less than D2, AP 304A can determine to allow reuse in its BSS 302A. Accordingly, AP 304A can send an IE indicating that STAs can reuse the wireless medium, and the OBSS_Thresh. In some embodiments, the AP 304A and 304B can signal each other in order to determine a reuse agreement.

APs with Multiple Basic Service Set Identifiers (BSSIDs)/Co-Located APs

In various embodiments, AP 304A can have multiple BSSIDs. In one embodiment, the AP 304A can signal to the BSS 302A which colors should be deferred to. For example, the AP 304A can indicate all colors of APs within a certain distance and/or RSSI. Various embodiments of such deferral described in U.S. Provisional Application No. 62/174,444, filed Jun. 11, 2015, the entirety of which is hereby incorporated by reference. In another embodiment, the AP 304A can select the same color as nearby APs (such as the AP 304B).

In some embodiments, the AP 304A can provide the color of an OBSS to be deferred to. The colors of all the OBSSs to be deferred to can be included in a management frame. Subsequently, when the STA 306A receives a packet, the STA 306A determines the color of the packet and determines whether the color of the packet matches the color of the BSS 302A or one of the colors the OBSSs to be deferred to. When the color of the packet matches one of those colors, the STA 306A observes the packet. Otherwise, the STA 306A can choose to drop the packet.

In other embodiments, the AP 304A can assign the color of the BSS 302A as the same color of a particular OBSS (e.g., the BSS 302B) to be deferred to. The AP 304A can choose not to send any indications to the one or more stations of the BSS 302A, as the stations are configured to observe packets of the color of the BSS 302A. As such, the stations of the BSS 302A can observe the packets from the BSS 302A and the particular OBSS having the same color. Further, the AP 304A can further negotiate with the access points of the OBSSs to be deferred to assign the same color to the BSS 302A and the OBSSs to be deferred to. Similarly, the AP 304A can choose not to send any indications to the one or more stations of the BSS 302A, as the stations are configured to observe packets having the color of the BSS 302A. As such, the stations of the BSS 302A can observe the packets from the BSS 302A and the OBSSs to be deferred to.

Implementing Methods

Figure 4:
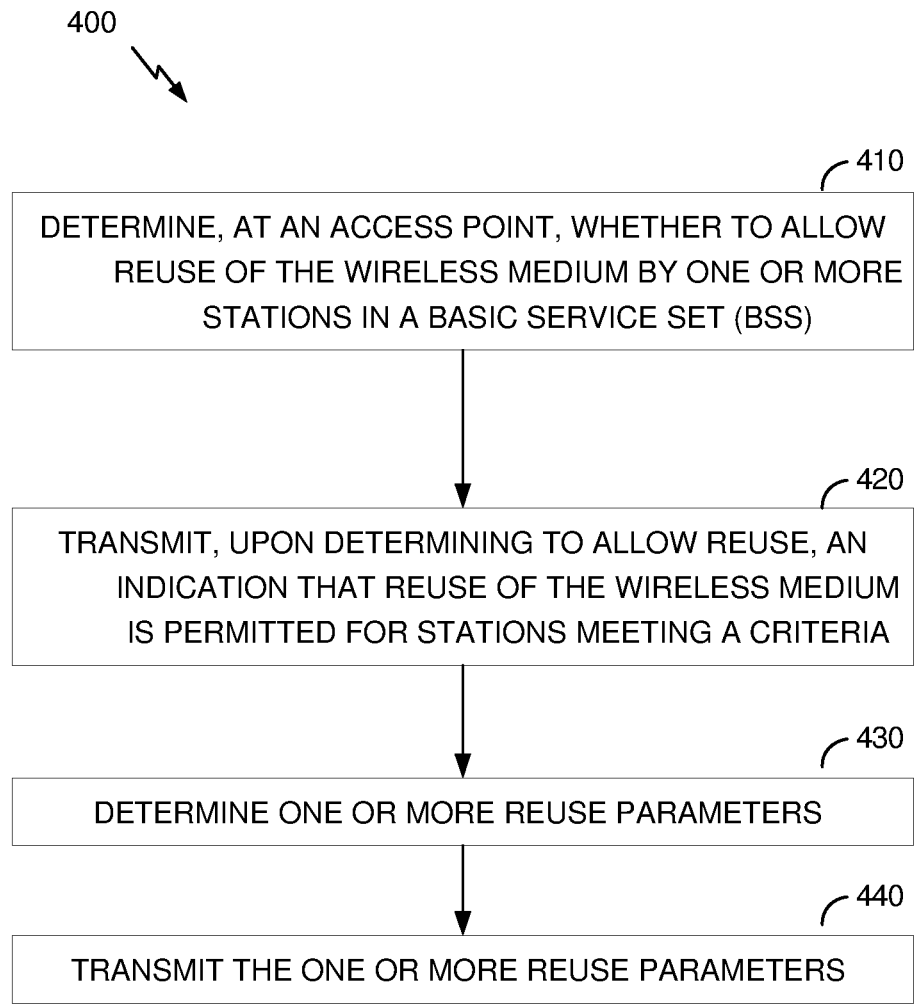
FIG. 4 shows a flowchart for an exemplary method of reusing a wireless medium that can be employed within the wireless communication system of FIG. 1.

FIG. 4 shows a flowchart 400 for an exemplary method of reusing a wireless medium that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIGS. 1 and 3, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 410, a wireless device determines whether to allow reuse of the wireless medium by one or more stations in a basic service set (BSS). For example, the AP 304A can decide if reuse is possible based on its BSS distance. In one example, the STA 306A can compute OBSS_Thresh based on information in a packet received from STA 306B.

In another example, the AP 304A can determine that the nearest APs (such as AP 304B) are farther than a distance D. The AP 304A can determine to allow reuse for all STAs in its BSS 302A so long as the STAs do not see any OBSS STAs within a distance D2. The AP 304A can send a Broadcast Information Element to the STAs 306A and 306C, telling them the requirement for reuse, and the OBSS_Thresh if they pass the requirement. In this example, for STAs that do not see any OBSS STAs (such as STA 306B) within distance D2, they can reuse the wireless medium with OBSS_Thresh as provided by the AP 304A.

In another example, the AP 304A can determine that neighbor APs (such as AP 304B) are farther than distance D. The AP 304A can broadcast the distance D1 to a farthest STA. The AP 304A can listen to neighbor APs broadcasted distance to their farthest STA. If AP 304A sees that neighboring AP have a farthest STA less than D2, and if D1 is less than D2, the AP 304A can allow reuse in its BSS 302A. Accordingly, the AP 304A can sent an Information Element telling STAs 306C and 306A that they can reuse the wireless medium and define OBSS_Thresh. In some embodiments, the AP 304A can also allow reuse based on an agreement with neighbor AP 304A.

Next, at block 420, the device transmits, upon determining to allow reuse, indication that reuse of the wireless medium is permitted for stations meeting a criteria. For example, the AP 304A can transmit a beacon or broadcast IE allowing reuse of the wireless medium for some or all stations within its BSS 302A.

Then, at block 430, the device can determine one or more reuse parameters. For example, the AP 304A can determine any of the reuse conditions discussed above with respect to FIG. 3. For example, the AP 304A can determine that stations are allowed to reuse the wireless medium when Mode 1, Mode 2, Mode 3 (or any combination thereof) rules are satisfied.

In various embodiments, a plurality of reuse parameters can be different for different stations. In other words, different reuse parameters can be determined for, associated with, and communicated to different stations on a per-station basis. As an example, the AP 304A can determine a first set of reuse parameters for the STA 304B, and can communicate the first set of reuse parameters to the STA 304B (either directly or in a broadcast message). Similarly, the AP 304A can determine a second set of reuse parameters for the STA 304A, and can communicate the second set of reuse parameters to the STA 304A (either directly or in a broadcast message). In some embodiments, different reuse parameters can be determined for, associated with, and communicated to different groups of stations on a per-group basis. As an example, the AP 304A can determine a first set of reuse parameters for a first group of stations including the STA 304A and the STA 304B, and can communicate the first set of reuse parameters to the STA 304A and the STA 304B (either directly or in a broadcast message). Similarly, the AP 304A can determine a second set of reuse parameters for a second group of stations (including one or more STAs not shown), and can communicate the second set of reuse parameters to the second group of stations (either directly or in a broadcast message).

Thereafter, at block 440, the device can transmit the one or more reuse parameters. For example, the AP 304A can transmit a beacon or broadcast IE defining the reuse parameters to some or all stations within its BSS 302A. In various embodiments, the reuse parameters can be transmitted with the indication that reuse is permitted. In other embodiments, the reuse parameters can be transmitted separately.

In various embodiments, the method can further include selecting a reuse mode comprising one or more of the following conditions either alone or in combination: stations can be permitted to reuse the wireless medium when detecting an overlapping BSS (OBSS) transmission from a transmitting device that can have a received signal strength indication (RSSI) less than a first threshold, stations can be permitted to reuse the wireless medium when a destination device of the OBSS transmission can have an RSSI less than a second threshold, and stations can be permitted to reuse the wireless medium when the transmitting device and/or intended receiving device can have an RSSI less than a dynamic threshold that can be a function of one or more preamble parameters. The method can further include transmitting an indication of the selected reuse mode.

In various embodiments, the first threshold and the second threshold can be the same. In various embodiments, the dynamic threshold can be a function of a transmit power of the transmitting device and/or of an intended receiver. In various embodiments, the one or more reuse parameters can include one or more of: a transmit power, an energy detection (ED) level, a transmitter received signal strength indication (RSSI) threshold, an intended receiver RSSI threshold, a RSSI threshold function based on one or more preamble parameters, and an indication of an amount of interference tolerated at nodes as a function of one or more parameters.

In various embodiments, determining whether to allow reuse of the wireless medium can be based on a BSS distance of an access point and/or a BSS distance of the one or more stations. In various embodiments, the method can further include determining to allow reuse of the wireless medium and using enhanced request-to-send and/or enhanced clear-to-send transmissions. In various embodiments, the criteria can define that all stations in the BSS can be allowed to reuse the wireless medium.

In various embodiments, the criteria can define that a subset of stations in the BSS can be allowed to reuse the wireless medium. In various embodiments, the subset of stations can be based on their BSS distance. In various embodiments, the access point can have multiple BSS identifiers, the method further comprising signaling one or more colors to which the one or more stations should defer, or selecting the same color as a neighboring access point.

In an embodiment, the method shown in FIG. 4 can be implemented in a wireless device that can include a determining circuit and a transmitting circuit. Those skilled in the art will appreciate that a wireless device can have more components than the simplified wireless device described herein. The wireless device described herein includes only those components useful for describing some prominent features of implementations within the scope of the claims.

The determining circuit can be configured to determine whether reuse is allowed, and/or determine the applicable reuse parameters. In some embodiments, the determining circuit can be configured to perform at least one of blocks 410 and 430 of FIG. 4. The determining circuit can include one or more of the processor 204 (FIG. 2), the memory 206 (FIG. 2), and the DSP 220 (FIG. 2). In some implementations, means for determining can include the determining circuit.

The transmitting circuit can be configured to transmit the indication that reuse is allowed and/or the reuse parameters. In some embodiments, the transmitting circuit can be configured to perform at least one of blocks 420 and 440 of FIG. 4. The transmitting circuit can include one or more of the transmitter 210 (FIG. 2), the antenna 216 (FIG. 2), and the transceiver 214 (FIG. 2). In some implementations, means for transmitting can include the transmitting circuit.

In various embodiments, the wireless device can include a selecting circuit. The selecting circuit can be configured to select a reuse mode. The selecting circuit can include one or more of the processor 204 (FIG. 2), the memory 206 (FIG. 2), and the DSP 220 (FIG. 2). In some implementations, means for selecting can include the selecting circuit.

Figure 5:
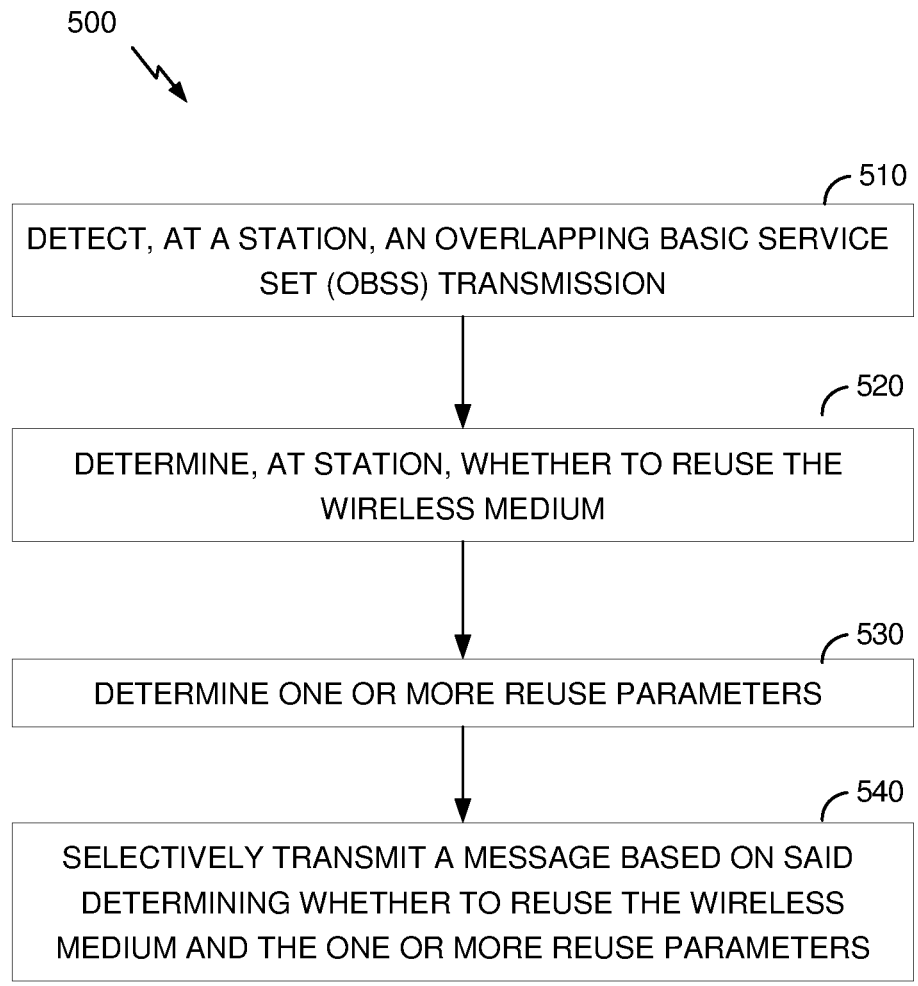
FIG. 5 shows a flowchart for an exemplary method of reusing a wireless medium that can be employed within the wireless communication system of FIG. 1.

FIG. 5 shows a flowchart 500 for an exemplary method of reusing a wireless medium that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIGS. 1 and 3, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 510, a wireless device can detect an overlapping basic service set (OBSS) transmission. For example, the STA 306A can detect an OBSS transmission from the STA 306B.

Then, at block 520, the wireless device can determine whether to reuse the wireless medium. For example, the STA 306A can receive in indication from the AP 304A that reuse of the wireless medium is allowed. In another embodiment, the STA 306A can unilaterally determine that reuse of the wireless medium is allowed, for example, based on DSC and/or information in the transmission from the STA 306B.

Next, at block 530, the wireless device can determine one or more reuse parameters. For example, the STA 306A can receive the reuse parameters from the AP 304A via a beacon or broadcast IE. In another embodiment, the STA 306A can unilaterally determine the reuse parameters, for example, based on parameters that are hard coded or stored in memory, and/or information in the transmission from the STA 306B.

In various embodiments, a plurality of reuse parameters can be different for different stations. In other words, different reuse parameters can be determined for, associated with, and/or received at different stations on a per-station basis. As an example, the STA 306C can receive a first set of reuse parameters from the AP 304A via a beacon or broadcast IE. Similarly, the STA 306A can receive a second set of reuse parameters from the AP 304A via a beacon or broadcast IE. Alternatively, the STAs 306A and 306C can each determine their own different reuse parameters unilaterally. In some embodiments, different reuse parameters can be determined for, associated with, and/or received at different groups of stations on a per-group basis. As an example, a first group of stations, including the STA 304A and the STA 304, can receive a first set of reuse parameters from the AP 304A via a beacon or broadcast IE. Similarly, a second group of stations (including one or more STAs not shown) can receive a second set of reuse parameters from the AP 304A via a beacon or broadcast IE.

Thereafter, at block 540, the wireless device can selectively transmit a message based on said determining whether to reuse the wireless medium and the one or more reuse parameters. For example, the STA 306A can compare the reuse parameters (such as OBSS_Thresh) to the transmission from the STA 306B. In one example, the STA 306A can transmit the message when the RSSI of the transmission from the STA 306B is less than the RSSI defined in OBSS_Thresh.

In an embodiment, the method shown in FIG. 5 can be implemented in a wireless device that can include a detecting circuit, a determining circuit, and a transmitting circuit. Those skilled in the art will appreciate that a wireless device can have more components than the simplified wireless device described herein. The wireless device described herein includes only those components useful for describing some prominent features of implementations within the scope of the claims.

The detecting circuit can be configured to detect the OBSS transmission. In some embodiments, the detecting circuit can be configured to perform at least block 510 of FIG. 5. The detecting circuit can include one or more of the receiver 212 (FIG. 2), the DSP 220, the processor 204, the memory 206, the signal detector 218, the antenna 216 (FIG. 2), and the transceiver 214 (FIG. 2). In some implementations, means for detecting can include the detecting circuit.

The determining circuit can be configured to determine whether reuse is allowed, and/or determine the applicable reuse parameters. In some embodiments, the determining circuit can be configured to perform at least one of blocks 520 and 530 of FIG. 5. The determining circuit can include one or more of the processor 204 (FIG. 2), the memory 206 (FIG. 2), and the DSP 220 (FIG. 2). In some implementations, means for determining can include the determining circuit.

The transmitting circuit can be configured to selectively transmit a message reusing the wireless medium. In some embodiments, the transmitting circuit can be configured to perform at least one of blocks 520 and 540 of FIG. 5. The transmitting circuit can include one or more of the transmitter 210 (FIG. 2), the antenna 216 (FIG. 2), and the transceiver 214 (FIG. 2). In some implementations, means for transmitting can include the transmitting circuit.

In various embodiments, the wireless device can include a selecting circuit. The selecting circuit can be configured to select a reuse mode. The selecting circuit can include one or more of the processor 204 (FIG. 2), the memory 206 (FIG. 2), and the DSP 220 (FIG. 2). In some implementations, means for selecting can include the selecting circuit.

In various embodiments, the wireless device can include a receiving circuit. The receiving circuit can be configured to receiving the reuse indication and/or reuse parameters, for example as a beacon or IE from the AP. The receiving circuit can include one or more of the receiver 212 (FIG. 2), the DSP 220, the antenna 216 (FIG. 2), and the transceiver 214 (FIG. 2). In some implementations, means for receiving can include the receiving circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, the terms "and" or "or" may be interchangeable, and may be interpreted as "and/or" (e.g., anywhere from one to all of the items in a list).

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method for wireless communication, comprising:
transmitting, by an access point of a first basic service set (BSS) to a plurality of stations in the first BSS, a first indication including one or more first reuse parameters for enabling reuse of a wireless channel by the plurality of stations in the first BSS, the one or more first reuse parameters including an intra-BSS received signal strength indication (RSSI) threshold to be used by the stations of the plurality of stations in the first BSS in response to detecting a wireless transmission on the wireless channel when performing a clear channel assessment (CCA) on the wireless channel and determining based on a signal field or a MAC header of the wireless transmission that the wireless transmission is from a station in the first BSS, the first indication indicating that the stations of the plurality of stations in the first BSS performing the CCA are permitted to transmit on the wireless channel when the detected wireless transmission is from the station in the first BSS and has an RSSI below the intra-BSS RSSI detection threshold; and
transmitting, by the access point to the plurality of stations in the first BSS, a second indication including one or more second reuse parameters for enabling reuse of the wireless channel by the plurality of stations in the first BSS, the second indication indicating that the stations of the plurality of stations in the first BSS performing the CCA are permitted to transmit on the wireless channel when the detected wireless transmission is from a station in an overlapping basic service set (OBSS) operating on the same channel as the first BSS and has an RSSI below an inter-BSS RSSI detection threshold greater than the intra-BSS RSSI detection threshold, the one or more second reuse parameters including the inter-BSS RSSI detection threshold to be used by the stations of the plurality of stations in the first BSS in response to detecting a wireless transmission on the wireless channel when performing the CCA on the wireless channel and determining based on the signal field or the MAC header of the wireless transmission that the wireless transmission is from the station in the OBSS operating on the same channel as the first BSS, the determination that the station is in the OBSS operating on the same channel as the first BSS causing the stations in the first BSS to apply the inter-BSS RSSI detection threshold instead of the intra-BSS RSSI detection threshold during the CCA on the wireless channel.

2. A method for wireless communication, comprising:
receiving, by a first station of a first basic service set (BSS) that includes a plurality of stations, a first indication including one or more first reuse parameters for enabling reuse of a wireless channel by the plurality of stations in the first BSS, the one or more first reuse parameters including an intra-BSS received signal strength indication (RSSI) threshold to be used by the stations of the plurality of stations in the first BSS in response to detecting a wireless transmission on the wireless channel when performing a clear channel assessment (CCA) on the wireless channel and determining based on a signal field or a MAC header of the wireless transmission that the wireless transmission is from another station in the first BSS, the first indication indicating that the stations of the plurality of stations in the first BSS performing the CCA are permitted to transmit on the wireless channel when the detected wireless transmission is from the other station in the first BSS and has an RSSI below the intra-BSS RSSI detection threshold;
receiving, by the first station, a second indication including one or more second reuse parameters for enabling reuse of the wireless channel by the plurality of stations in the first BSS, the second indication indicating that the stations of the plurality of stations in the first BSS performing the CCA are permitted to transmit on the wireless channel when the detected wireless transmission is from a station in an overlapping basic service set (OBSS) operating on the same channel as the first BSS and has an RSSI below an inter-BSS RSSI detection threshold greater than the inter-BSS RSSI detection threshold, the one or more second reuse parameters including the inter-BSS RSSI detection threshold to be used by the stations of the plurality of stations in the first BSS in response to detecting the wireless transmission on the wireless channel when performing the CCA on the wireless channel and determining based on the signal field or the MAC header of the wireless transmission that the wireless transmission is from the station in the OBSS operating on the same channel as the first BSS;
receiving, by the first station, a first wireless transmission on the wireless channel;
determining, by the first station, based at least in part on a signal field or a MAC header of the first wireless transmission, whether the first wireless transmission is from a station in the first BSS or is from a station in an OBSS;
responsive to determining that the first wireless transmission is from the station in the OBSS, applying, by the first station, the inter-BSS RSSI detection threshold instead of the intra-BSS RSSI detection threshold;
determining, by the first station, whether or not the first wireless transmission has an RSSI below the inter-BSS RSSI detection threshold; and
responsive to determining that the first wireless transmission has an RSSI below the inter-BSS RSSI detection threshold, transmitting, by the first station, a message on the wireless channel.

3. An access point, comprising:

a processor configured to:

determine one or more first reuse parameters for enabling reuse of a wireless channel by a plurality of stations in a first basic service set (BSS), the one or more first reuse parameters including an intra-BSS received signal strength indication (RSSI) threshold to be used by the stations of the plurality of stations in the first BSS in response to detecting a wireless transmission on the wireless channel when performing a clear channel assessment (CCA) on the wireless channel and determining based on a signal field or a MAC header of the wireless transmission that the wireless transmission is from a station in the first BSS, the first reuse parameters indicating that the stations of the plurality of stations in the first BSS performing the CCA are permitted to transmit on the wireless channel when the detected wireless transmission is from the station in the first BSS and has an RSSI below the intra-BSS RSSI detection threshold, and determine one or more second reuse parameters for enabling reuse of the wireless channel by the plurality of stations in the first BSS, the second reuse parameters indicating that the stations of the plurality of stations in the first BSS performing the CCA are permitted to transmit on the wireless channel when the detected wireless transmission is from a station in an overlapping basic service set (OBSS) operating on the same channel as the first BSS and has an RSSI below an inter-BSS RSSI detection threshold greater than the intra-BSS RSSI detection threshold, the one or more second reuse parameters including the inter-BSS RSSI detection threshold to be used by the stations of the plurality of stations in the first BSS in response to detecting a wireless transmission on the wireless channel when performing the CCA on the wireless channel and determining based on the signal field or the MAC header of the wireless transmission that the wireless transmission is from the station in the OBSS operating on the same channel as the first BSS, the determination that the station is in the OBSS operating on the same channel as the first BSS causing the stations in the first BSS to apply the inter-BSS RSSI detection threshold instead of the intra-BSS RSSI detection threshold during the CCA on the wireless channel; and a transmitter configured to transmit a first indication to the plurality of stations in the first BSS that includes the one or more first reuse parameters, and to transmit a second indication to the plurality of stations in the first BSS that includes the one or more second reuse parameters.

4. A wireless communication station, comprising:

a transmitter;

a receiver configured to:

receive a first indication including one or more first reuse parameters for enabling reuse of a wireless channel by a plurality of stations in a first basic service set (BSS) that includes the wireless communication station, the one or more first reuse parameters including an intra-BSS received signal strength indication (RSSI) threshold to be used by the stations of the plurality of stations in the first BSS in response to detecting a wireless transmission on the wireless channel when performing a clear channel assessment (CCA) on the wireless channel and determining based on a signal field or a MAC header of the wireless transmission that the wireless transmission is from another station in the first BSS, the first indication indicating that the stations of the plurality of stations in the first BSS performing the CCA are permitted to transmit on the wireless channel when the detected wireless transmission is from the other station in the first BSS and has an RSSI below the intra-BSS RSSI detection threshold, receive a second indication including one or more second reuse parameters for enabling reuse of the wireless channel by the plurality of stations in the first BSS, the second indication indicating that the stations of the plurality of stations in the first BSS performing the CCA are permitted to transmit on the wireless channel when the detected wireless transmission is from a station in an overlapping basic service set (OBSS) operating on the same channel as the first BSS and has an RSSI below an inter-BSS RSSI detection threshold greater than the inter-BSS RSSI detection threshold, the one or more second reuse parameters including the inter-BSS RSSI detection threshold to be used by the stations of the plurality of stations in the first BSS in response to detecting a wireless transmission on the wireless channel when performing the CCA on the wireless channel and determining based on the signal field or the MAC header of the wireless transmission that the wireless transmission is from the station in the OBSS operating on the same channel as the first BSS, and receive a first wireless transmission on the wireless channel; and a processor configured to:

determine, based on a signal field or a MAC header of the first wireless transmission, whether the first wireless transmission is from a station in the first BSS or is from a station in an OBSS, responsive to determining that the first wireless transmission is from the station in the OBSS, applying the inter-BSS RSSI detection threshold when performing a CCA on the wireless channel instead of the intra-BSS RSSI detection threshold;

determine whether or not the first wireless transmission has an RSSI below the inter-BSS RSSI detection threshold, and responsive to determining that the first wireless transmission has an RSSI below the inter-BSS RSSI detection threshold, cause the transmitter to transmit a message on the wireless channel.

* * * * *